United States Patent
Mo et al.

(10) Patent No.: US 9,832,198 B2
(45) Date of Patent: Nov. 28, 2017

(54) SERVICE-BASED MESSAGE ACCESS LAYER FRAME AND IMPLEMENTATION METHOD THEREOF

(71) Applicant: G-CLOUD TECHNOLOGY Co. Ltd, Dongguan, Guangdong (CN)

(72) Inventors: Zhanpeng Mo, Guangdong (CN); Song Yang, Guangdong (CN); Tongkai Ji, Guangdong (CN)

(73) Assignee: G-CLOUD TECHNOLOGY Co. Ltd, DongGuan, Guangdong (CN)

( * ) Notice: Subject to any disclaimer, the term of this patent is extended or adjusted under 35 U.S.C. 154(b) by 159 days.

(21) Appl. No.: 14/772,338

(22) PCT Filed: Dec. 19, 2014

(86) PCT No.: PCT/CN2014/094335
§ 371 (c)(1),
(2) Date: Sep. 2, 2015

(87) PCT Pub. No.: WO2015/169090
PCT Pub. Date: Nov. 12, 2015

(65) Prior Publication Data
US 2016/0352736 A1    Dec. 1, 2016

(30) Foreign Application Priority Data

May 9, 2014    (CN) .......................... 2014 1 0195515

(51) Int. Cl.
*H04L 29/06*      (2006.01)
*H04L 29/08*      (2006.01)

(52) U.S. Cl.
CPC ............ *H04L 63/10* (2013.01); *H04L 63/083* (2013.01); *H04L 67/10* (2013.01); *H04L 67/125* (2013.01); *H04L 67/2823* (2013.01); *H04L 63/08* (2013.01)

(58) Field of Classification Search
CPC ......... H04L 9/00; H04L 63/08; H04L 67/146; G06F 15/16; G06F 9/445;
(Continued)

(56) References Cited

U.S. PATENT DOCUMENTS

| | | | |
|---|---|---|---|
| 6,914,893 B2 * | 7/2005 | Petite ..................... | G01V 1/364 370/310 |
| 7,231,661 B1 * | 6/2007 | Villavicencio .......... | G06F 21/41 709/225 |

(Continued)

*Primary Examiner* — Thanhnga B Truong

(57) ABSTRACT

A message access layer frame and an implementation method thereof are provided, relating to a technical field of software. After initiating a system, a controller parses a configuration file, initiates a database access service unit and initializes and initiates other components. After an application front end sends a request, a receiver receives the request of the application front end, translates the request into data in a consistent format and sends the data in the consistent format to a next handling module. An account password checker and a session processor, serving as main information handling modules of the frame, handle a client request and send the handled client request to the repeater. A repeater translates the handled data in the consistent format into data acceptable to an application back end and sends the data acceptable to the application back end to the application back end for a data handling by cloud.

6 Claims, 1 Drawing Sheet

(58) Field of Classification Search
CPC .......... G06F 2221/2115; G06F 15/173; G05B 2219/31093; Y02P 90/10; G01V 1/36; G01V 1/28; G08B 25/00
USPC ........ 726/1–8; 709/219, 224, 225, 227, 228, 709/229; 370/310, 328, 338, 401; 713/151, 155, 168; 705/35, 7.12, 7.13
See application file for complete search history.

(56) References Cited

U.S. PATENT DOCUMENTS

| | | | | |
|---|---|---|---|---|
| 8,380,820 | B1* | 2/2013 | Kumarjiguda | .... H04L 29/08099 709/219 |
| 8,738,770 | B2* | 5/2014 | Kumarjiguda | ...... H04L 67/2809 709/219 |
| 8,832,814 | B2* | 9/2014 | Coletta | ................. H04L 63/00 705/35 |
| 2014/0196022 | A1* | 7/2014 | Skutin | ................ G06F 9/44505 717/176 |

* cited by examiner

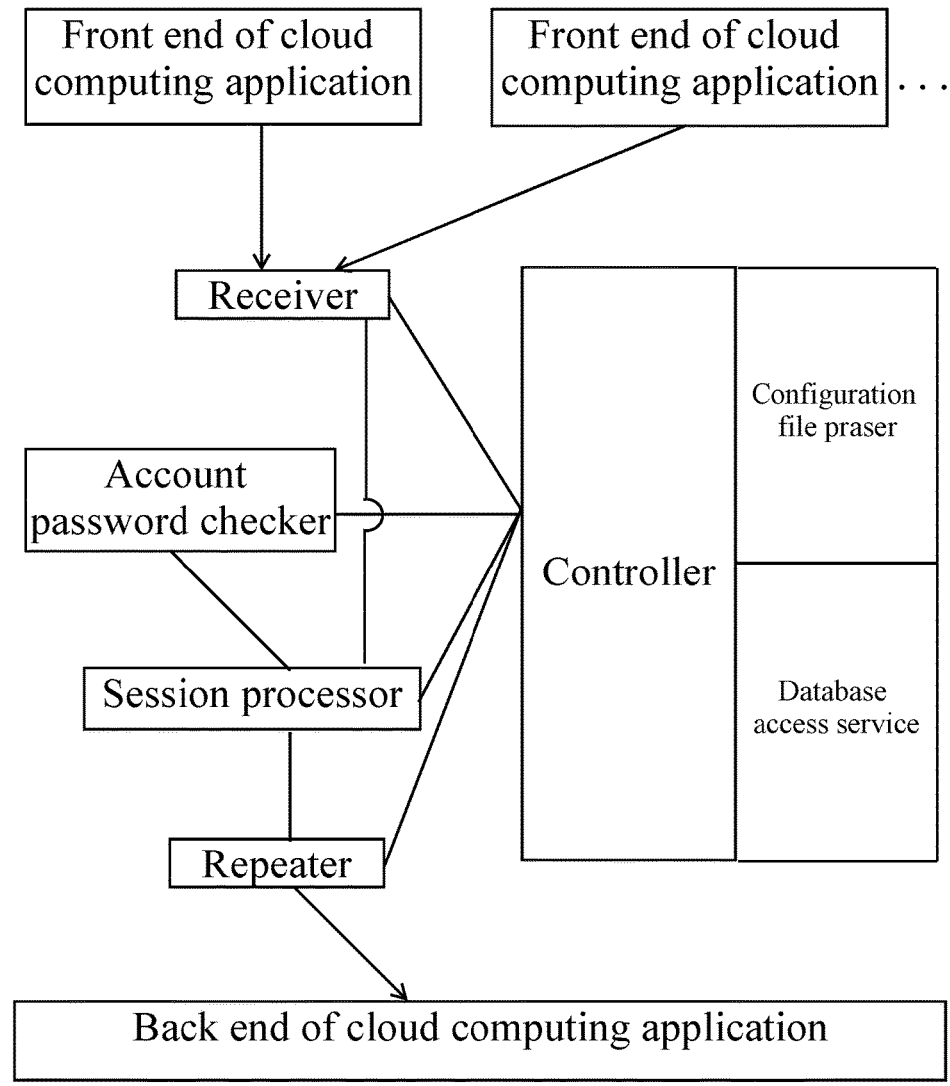

SERVICE-BASED MESSAGE ACCESS LAYER FRAME AND IMPLEMENTATION METHOD THEREOF

CROSS REFERENCE OF RELATED APPLICATION

This is a U.S. National Stage under 35 U.S.C 371 of the International Application PCT/CN2014/094335, filed Dec. 19, 2014, which claims priority under 35 U.S.C. 119(a-d) to CN 201410195515.1, filed May 9, 2014.

BACKGROUND OF THE PRESENT INVENTION

Field of Invention

The present invention relates to a technical field of software, and more particularly to a message access layer frame and an implementation method thereof.

Description of Related Arts

With the expansion in the application scale of the cloud computing, for the various types of clients, the various types of front ends are connected to the back end. According to the different requirements, the front ends adopt different protocols for communicating, such as the common Http protocol, the compressed Http protocol for the mobile equipment communication, the various online video communication protocol, the conventional SOAP protocol and the RPC protocol, and even the customized communication protocol. When the front ends are connected to the back end, all of the front ends are required to be handled with the login management, the rights management and the behavior auditing. The above handlings are collectively called the access layer. Conventionally, the cloud computing application requires the independent development of the access layer, which has the following problems.

Firstly, all of the front ends are connected to the back end independently. It is failed to balance the access frequency of each front end. The sporadic large access amount of some front end leads to the excessive pressure on the back end, which influences the access speed of the other front ends.

Secondly, the independent account authentication is required for each front end; all of the front ends are connected to the same authentication database, posing the high security threat to the authentication database.

Thirdly, the access layer is developed for each front end, mostly in the repeated manner, which increases the workload of the developer.

SUMMARY OF THE PRESENT INVENTION

An object of the present invention is to provide a message access layer frame to solve problems of different protocols, low security and high development workload of conventional application front ends.

Another object of the present invention is to provide a method for implementing the message access layer frame to solve the problems of the different protocols, the low security and the high development workload of the conventional application front ends.

Accordingly, the present invention adopts the following technical solutions.

A message access layer frame comprises a controller, a receiver, an account password checker, a session processor and a repeater, wherein:

the controller comprises a configuration file parser and a database access service unit; the controller is for initiating, initializing and coordinating the receiver, the account password checker, the session processor and the repeater;

the receiver is for receiving a request of an application front end in various forms; after receiving data in different formats, the receiver translates the received data in the different formats into data in a consistent format and then sends the data in the consistent format to the session processor;

the account password checker is for controlling and validating an access of the request of the application front end and thereafter sending the request to the repeater;

the session processor, serving as a main handling module of the whole message access layer frame, is for handling the request of the application front end with a login management, a rights management, a behavior auditing, a log, a single sign-on and interface exposing; and the repeater is for translating the handled data in the consistent format into data acceptable to an application back end, and then sending the data acceptable to the application back end to the application back end to be handled by cloud.

The request of the application front end comes from a web front end or a client of a customized application layer protocol.

A method for implementing the message access layer frame comprises steps of:

(1) after initiating a system, parsing a configuration file, initiating a database access service unit, and initializing and initiating a receiver, an account password checker, a session processor and a repeater of the message access layer frame by a controller;

(2) after an application front end sends a request, receiving the request of the application front end, translating the request of the application front end into data in a consistent format and sending the data in the consistent format to the session processor by the receiver;

(3) handling a client request and sending the handled client request to the repeater, by the account password checker and the session processor which serve as main information handling modules of the frame; and (4) translating the handled data in the consistent format into data acceptable to an application back end, and then sending the data acceptable to the application back end to the application back end for a data handling by cloud, by the repeater.

A working process of the controller comprises steps of:

(a) reading and parsing the configuration file; initiating the receiver according to the configuration file, wherein the receiver is different in accordance with the different application front ends and depends on a communication protocol of the application front end;

(b) initiating the repeater, wherein the repeater is different in accordance with the different application back ends and depends on a communication manner of the application back end;

(c) initiating the database access service unit; initiating the account password checker with a connection provided by the database access service unit; and obtaining validation information of an account from a database; and (d) finally initiating the session processor which has no session therein initially.

A handling logic of the controller is describes as follows.

A strategy assigned by the configuration file determines which modules the request passes through and how the request is handled. Once a problem occurs, a handling chain is stopped and the request is returned to the controller in advance. The controller, according to returned abnormal information, returns a response to the client request in advance through the receiver and finishes a request response.

The receiver, as a server, continually receives the request of the application front end and, after receiving, assigns a unique ID to each the request.

The session processor contains connection information from the different application front ends, wherein the connection information is called sessions.

Each session is distinguished by a unique ID, sessionId. Each application front end is assigned the sessionId after connecting to the message access layer frame for a first time and being checked by the account password checker. Subsequent connections of the application front end must contain the sessionId in the request.

A complete process of handling the request comprises steps of:

extracting the session ID from each request and checking whether the session ID already exists by the session processor;

if the session ID exists, namely that the session already exists, sending the session to the repeater;

if the session ID does not exist, namely that the session is a new session, sending the session to the account password checker for an authentication;

if the authentication is failed, directly returning an error code to the application front end without continuing sending the session;

if the authentication is passed, registering the session and returning success authentication information to the application front end; and after sending response information, destroying corresponding connection information by the receiver, wherein the receiver is merely responsible for receiving and returning the request; each request is independent; and, once handling of the request is finished, the receiver readily eliminates the corresponding connection information and waits for a next request.

The present invention has following benefits.

Firstly, the present invention is able to balance a load among the different application front ends and reduce a pressure of the application back end.

Secondly, the message access layer frame serves as a sole access of each application, which improves security; moreover, the message access layer frame combines management with accessing, isolates the application front ends from the application back end, and simplifies program logics of the application front ends and the application back end.

Thirdly, the present invention is able to reuse codes and reduce a workload of developing the access layer.

These and other objectives, features, and advantages of the present invention will become apparent from the following detailed description, the accompanying drawings, and the appended claims.

BRIEF DESCRIPTION OF THE DRAWINGS

The present invention is further illustrated with the accompanying drawing.

The FIGURE is a flow chart of a method for implementing a message access layer frame according to a preferred embodiment of the present invention.

DETAILED DESCRIPTION OF THE PREFERRED EMBODIMENT

Referring to the FIGURE, according to a preferred embodiment of the present invention, a message access layer frame comprises a controller, a receiver, an account password checker, a session processor and a repeater, wherein:

the controller comprises a configuration file parser and a database access service unit; and the controller initiates, initializes and coordinates the receiver, the account password checker, the session processor and the repeater;

the receiver receives a request of an application front end in various forms, and after receiving data in different formats, translates the received data in the different formats into data in a consistent format, and then sends the data in the consistent format to the session processor;

the account password checker controls and validates an access of the request of the application front end and thereafter sends the request to the repeater;

the session processor, serving as a main handling module of the whole message access layer frame, handles the request of the application front end with a login management, a rights management, a behavior auditing, a log, a single sign-on and interface exposing; and the repeater translates the handled data in the consistent format into data acceptable to an application back end, and then sends the data acceptable to the application back end to the application back end to be handled by cloud.

A working process of the whole message access layer frame is described as follows.

After initiating a system, the controller parses a configuration file through the configuration file parser and initiates the database access service unit; then the controller initiates the receiver according to the configuration file, wherein the receiver is different in accordance with the different application front ends and depends on a communication protocol of the application front end; next, the controller initiates the repeater, wherein the repeater is different in accordance with the different application back ends and depends on a communication manner of the application back end; thereafter, the controller initiates the account password checker with a connection provided by the database access service unit, and obtains validation information of an account from a database; and finally, the controller initiates the session processor which has no session therein initially.

After the application front end sends the request, the receiver receives the request of the application front end, translates the request of the application front end into data in a consistent format and sends the data in the consistent format to the session processor, wherein: the receiver, as a server, continually receives the request of the application front end and, after receiving, assigns a unique ID to each request.

The session processor contains connection information from the different application front ends, wherein the connection information is called sessions, and each session is distinguished by the unique ID, sessionId; and the session processor extracts the session ID from each request and checks whether the session ID already exists;

if the session ID exists, namely that the session already exists, the session is sent to the repeater;

if the session ID does not exist, namely that the session is a new session, the session is sent to the account password checker for an authentication;

if the authentication is failed, an error code is directly returned to the application front end without continuing sending the session; and if the authentication is passed, the session is registered and success authentication information is returned to the application front end.

After the repeater receives the data in the consistent format, the repeater translates the data in the consistent format into data acceptable to the application back end, and then sends the data acceptable to the application back end to the application back end for a data handling by cloud.

During the above process, it is noted that a strategy assigned by the configuration file determines which modules the request passes through and how the request is handled; once a problem occurs, a handling chain is stopped and the request is returned to the controller in advance; and the controller, according to returned abnormal information, returns a response to the request in advance through the receiver and finishes a request response.

After sending response information, the receiver destroys the corresponding connection information, wherein the receiver is merely responsible for receiving and returning the request; each request is independent; and, once handling of the request is finished, the receiver readily eliminates the corresponding connection information and waits for a next request.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A message access layer frame, comprising: a controller, a receiver, an account password checker, a session processor and a repeater, wherein:

the controller comprises a configuration file parser and a database access service unit; and, the controller initiates, initializes and coordinates the receiver, the account password checker, the session processor and the repeater;

the receiver receives a request of an application front end in various forms, and after receiving data in different formats, translates the received data in the different formats into data in a consistent format, and then sends the data in the consistent formation to the session processor;

the account password checker controls and validates an access of the request of the application front end and thereafter sends the request to the repeater;

the session processor, serving as a main handling module of the whole message access layer frame, handles the request with a login management, a right management, a behavior auditing, a log, a single sign-on and interface exposing;

the repeater translates the handled data in the consistent format into data acceptable to an application back end, and then sends the data acceptable to the application back end to the application back end to be handled by cloud; and the message access layer frame has a working process that:

after initiating a system, the controller parses a configuration file through the configuration file parser and initiates the database access service unit; then the controller initiates the receiver according to the configuration file, wherein the receiver is different in accordance with the different application front ends and depends on a communication protocol of the application front end; next, the controller initiates the repeater, wherein the repeater is different in accordance with the different application back ends and depends on a communication manner of the application back end; thereafter, the controller initiates the account password checker with a connection provided by the database access service unit, and obtains validation information of an account from a database; and finally, the controller initiates the session processor which has no session therein initially;

after the application front end sends the request, the receiver receives the request of the application front end, translates the request of the application front end into the data in the consistent format and sends the data in the consistent format to the session processor, wherein: the receiver, as a server, continually receives the request of the application front end and, after receiving, assigns a unique ID to each request;

the session processor contains connection information from the different application front ends, wherein the connection information is called sessions, and each session is distinguished by the unique ID, session Id; and the session processor extracts the session ID from each request and checks whether the session ID already exists;

if the session ID exists, which means that the session already exists, the session is sent to the repeater;

if the session ID does not exist, which means that the session is a new session, the session is sent to the account password checker for an authentication;

if the authentication is failed, an error code is directly returned to the application front end without continuing sending the session; and if the authentication is passed, the session is registered and success authentication information is returned to the application front end;

after the repeater receives the data in the consistent format, the repeater translates the data in the consistent format into the data acceptable to the application back end, and then sends the data acceptable to the application back end to the application back end for a data handling by cloud; and after sending response information, the receiver destroys the corresponding connection information, wherein the receiver is merely responsible for receiving and returning the request; each request is independent; and, once handling of the request is finished, the receiver readily eliminates the corresponding connection information and waits for a next request.

2. The message access layer frame, as recited in claim 1, wherein the request of the application front end comes from a web front end or a client of a customized application layer protocol.

3. A method for implementing a message access layer frame, comprising steps of:

initiating a system; parsing a configuration file through a configuration file parser and initiating a database access service unit by a controller; initiating a receiver, a repeater, an account password checker and a session processor by the controller;

after an application front end sends a request, the receiver receiving the request of the application front end, translating the request of the application front end into data in a consistent format and sending the data in the consistent format to the session processor, wherein: the receiver, as a server, continually receives the request of the application front end and, after receiving, assigns a unique ID to each request;

obtaining connection information from the different application front ends by the session processor, wherein the connection information is called sessions, and each session is distinguished by the unique ID, session Id; and, the session processor extracting the session ID from each request and checking whether the session ID already exists;

if the session ID exists, which means that the session already exists, sending the session to the repeater;

if the session ID does not exist, which means that the session is a new session, sending the session to the account password checker for an authentication;

if the authentication is failed, returning an error code directly to the application front end without continuing sending the session; and if the authentication is passed, registering the session and returning success authentication information to the application front end;

after the repeater receives the data in the consistent format, the repeater translating the data in the consistent format into data acceptable to an application back end, and then sending the data acceptable to the application back end to the application back end for a data handling by cloud; and after sending response information, the receiver destroying the corresponding connection information, wherein the receiver is merely responsible for receiving and returning the request; each request is independent; and, once handling of the request is finished, the receiver readily eliminates the corresponding connection information and waits for a next request.

4. The method for implementing the message access layer frame, as recited in claim 3, wherein: the receiver is initiated according to a configuration file; the repeater is different in accordance with the different application back ends and depends on a communication manner of the application back end; the account password checker is initiated with a connection provided by the database access service unit; and the session processor has no session therein initially.

5. The method for implementing the message access layer frame, as recited in claim 3, wherein: each application front end is assigned the session Id after connecting to the message access layer frame for a first time and being checked by the account password checker; and subsequent connections of the application front end must contain the session Id in the request.

6. The method for implementing the message access layer frame, as recited in claim 4, wherein: each application front end is assigned the session Id after connecting to the message access layer frame for a first time and being checked by the account password checker; and subsequent connections of the application front end must contain the session Id in the request.

* * * * *